(12) United States Patent
Vinck

(10) Patent No.: US 11,235,269 B2
(45) Date of Patent: Feb. 1, 2022

(54) DEVICE FOR SEPARATING LIQUID FROM A GAS STREAM WITHIN A LIQUID INJECTED COMPRESSOR AND METHOD THEREOF

(71) Applicant: ATLAS COPCO AIRPOWER, NAAMLOZE VENNOOTSCHAP, Wilrijk (BE)

(72) Inventor: Glenn Vinck, Wilrijk (BE)

(73) Assignee: ATLAS COPCO AIRPOWER, NAAMLOZE VENNOOTSCHAP, Wilrijk (BE)

(\*) Notice: Subject to any disclaimer, the term of this patent is extended or adjusted under 35 U.S.C. 154(b) by 126 days.

(21) Appl. No.: 16/499,485

(22) PCT Filed: Mar. 20, 2018

(86) PCT No.: PCT/IB2018/051851
§ 371 (c)(1),
(2) Date: Sep. 30, 2019

(87) PCT Pub. No.: WO2018/197967
PCT Pub. Date: Nov. 1, 2018

(65) Prior Publication Data
US 2020/0070078 A1     Mar. 5, 2020

Related U.S. Application Data

(60) Provisional application No. 62/490,830, filed on Apr. 27, 2017.

(30) Foreign Application Priority Data

Jul. 4, 2017    (BE) .................................. 2017/5477

(51) Int. Cl.
*B01D 45/00*     (2006.01)
*B01D 45/12*     (2006.01)
(Continued)

(52) U.S. Cl.
CPC ............ *B01D 45/12* (2013.01); *F04C 29/026* (2013.01); *B01D 45/02* (2013.01); *B01D 50/002* (2013.01); *B04C 5/28* (2013.01); *B04C 2009/002* (2013.01)

(58) Field of Classification Search
CPC ...... B01D 45/12; B01D 45/02; B01D 50/002; B01D 2247/101; B01D 2247/105;
(Continued)

(56) References Cited

U.S. PATENT DOCUMENTS 1,239,456 A \* 9/1917 Brantingham et al. ......................
                                                                         B01D 45/16
                                                                                   55/394
1,708,697 A \* 4/1929 Jensen .................... B04C 5/103
                                                                                   55/349

(Continued)

FOREIGN PATENT DOCUMENTS

CN           201441861 U     4/2010
CN           105311905 A     2/2016
(Continued)

OTHER PUBLICATIONS

International Search Report and Written Opinion PCT Application No. PCT/IB2018/051851, dated Jun. 13, 2018.

*Primary Examiner* — Dung H Bui
(74) *Attorney, Agent, or Firm* — Bacon & Thomas, PLLC

(57) ABSTRACT

A device for separating liquid from a gas stream within a liquid injected compressor, said device including a first vessel including a first bottom plate, a first lateral wall comprising an inlet fluidly connected with a compressed gas outlet and a lid including an outlet, the device further including: a first separation means; a second separation means; and a third separation means; whereby the device further includes an inlet channel being in fluid communication with said inlet, said inlet channel including a top panel
(Continued)

and a bottom panel, whereby at least said top panel is creating a slope, having the highest point onto the first lateral wall and the lowest point at the opposite end.

21 Claims, 5 Drawing Sheets

(51) Int. Cl.
  *F04C 29/02* (2006.01)
  *B01D 45/02* (2006.01)
  *B01D 50/00* (2006.01)
  *B04C 5/28* (2006.01)
  *B04C 9/00* (2006.01)

(58) Field of Classification Search
  CPC ....... B01D 47/06; B01D 47/10; F04C 29/026; F04C 18/16; F04C 29/0007; B04C 5/28; B04C 2009/002
  See application file for complete search history.

(56) References Cited

U.S. PATENT DOCUMENTS

| | | | | |
|---|---|---|---|---|
| 2,575,607 | A * | 11/1951 | Wallin | B04C 5/12 55/392 |
| 2,662,610 | A * | 12/1953 | Heinrich | B04C 3/04 55/347 |
| 2,698,672 | A * | 1/1955 | Burnside | B04C 5/13 55/410 |
| 2,867,290 | A * | 1/1959 | Mcgrane | B04C 5/28 55/344 |
| 2,904,130 | A * | 9/1959 | Chapler, Jr. | B04C 5/28 55/344 |
| 3,543,931 | A * | 12/1970 | Rastatter | B04C 5/28 209/728 |
| 3,853,505 | A * | 12/1974 | Tretter, Jr. | F26B 25/006 95/188 |
| 3,912,469 | A | 10/1975 | Ewan et al. | |
| 5,053,126 | A | 10/1991 | Krasnoff | |
| 5,221,301 | A * | 6/1993 | Giuricich | B01D 45/12 422/147 |
| 5,788,728 | A * | 8/1998 | Solis | B01D 50/002 55/422 |
| 6,238,451 | B1 * | 5/2001 | Conrad | A47L 9/122 55/323 |
| 6,279,556 | B1 * | 8/2001 | Busen | F01M 13/04 123/572 |
| 6,673,135 | B2 * | 1/2004 | West | B01D 19/0057 95/268 |
| 7,753,976 | B2 * | 7/2010 | Hyun | A47L 9/1608 55/343 |
| 7,931,719 | B2 * | 4/2011 | Sams | B01D 45/12 55/348 |
| 7,935,159 | B2 * | 5/2011 | Hyun | A47L 9/1633 55/337 |
| 2003/0000186 | A1 * | 1/2003 | West | B04C 5/28 55/459.1 |
| 2005/0229554 | A1 * | 10/2005 | Oh | B04C 5/04 55/346 |
| 2006/0230717 | A1 * | 10/2006 | Oh | B04C 5/24 55/343 |
| 2009/0197753 | A1 * | 8/2009 | Lajtonyi | C21B 7/22 494/42 |
| 2009/0205298 | A1 * | 8/2009 | Hyun | A47L 9/165 55/343 |
| 2010/0132316 | A1 * | 6/2010 | Ni | B04C 5/24 55/343 |
| 2010/0224073 | A1 * | 9/2010 | Oh | A47L 9/1666 96/416 |
| 2016/0288019 | A1 * | 10/2016 | Ernst | B01D 19/0057 |
| 2018/0207651 | A1 * | 7/2018 | Meirav | B04C 3/04 |
| 2018/0311601 | A1 * | 11/2018 | Gorrebeeck | F04C 29/026 |

FOREIGN PATENT DOCUMENTS

| | | |
|---|---|---|
| EP | 1915940 A1 | 4/2008 |
| JP | WO2014020837 A1 | 7/2016 |
| SU | 636036 A1 | 12/1978 |
| WO | 2016172770 A1 | 11/2016 |

* cited by examiner

DEVICE FOR SEPARATING LIQUID FROM A GAS STREAM WITHIN A LIQUID INJECTED COMPRESSOR AND METHOD THEREOF

This invention relates to a device for separating liquid from a gas stream within a liquid injected compressor, said device comprising a first vessel comprising a first bottom plate, a first lateral wall comprising an inlet fluidly connected with a compressed gas outlet and a lid comprising the outlet, the device further comprising:
- a first separation means comprising a first and a second liquid separation areas, said first and second liquid separation areas being in fluid communication with the inlet; whereby each of the first and second liquid separation area comprises a first plate onto which a circular wall is mounted, whereby a first and a second fluid channel is created between each of said circular wall and the first lateral wall;
- a second separation means provided in each of the first and second liquid separation area, said second separation means comprising at least a cyclone mounted therein;
- a third separation means comprising at least a filter mounted therein, whereby said filter is fluidly connected to one of said cyclones and whereby the third separation means is in fluid communication with the outlet; and
- the inlet channel comprising a fin type of structure for dividing the gas flowing through the inlet into two flows.

BACKGROUND OF THE INVENTION

Perfecting existing liquid separators is a continuous focus within the industry since the requirements for the purity of the gas exiting such liquid separators become more and more stringent.

While existing liquid separators might provide a good solution, as for example the one defined within WO 2016/172,770 A having Atlas Copco Airpower as applicant, the companies using such liquid separators are continuously looking to perfect such devices.

Accordingly it is an object of the present invention to provide an efficient liquid separator for which the purity of the gas flowing through the outlet is enhanced.

It is another object of the present invention to provide a solution for protecting even more the components of the liquid separator from the potentially damaging force of the fluid entering therein.

Another object of the present invention is to provide a simple and low cost alternative to existing devices.

SUMMARY OF THE INVENTION

The present invention solves at least one of the above and/or other problems by providing a device for separating a liquid from a gas stream within a liquid injected compressor, said device comprising a first vessel comprising a first bottom plate, a first lateral wall comprising an inlet fluidly connected with a compressed gas outlet and a lid comprising an outlet, the device further comprising:
- a first separation means comprising a first and a second liquid separation area, said first and second liquid separation area being in fluid communication with the inlet; whereby each of the first end second liquid separation area comprises a first plate onto which a circular wall is mounted, whereby a first and a second fluid channel is created between each of said circular wall and the first lateral wall;
- a second separation means provided in each of the first and second liquid separation area, said second separation means comprising at least a cyclone mounted therein;
- a third separation means comprising at least a filter mounted therein, whereby said filter is fluidly connected to one of said cyclones and whereby the third separation means is in fluid communication with the outlet;
- an inlet channel being in fluid communication with said inlet, the inlet channel comprising a fin type of structure for dividing the gas flowing through the inlet into two flows;

whereby the device further comprises
said inlet channel comprising a top panel and a bottom panel having one end adapted to be mounted onto the first lateral wall, whereby at least said top panel is creating a slope, having the highest point onto the first lateral wall and the lowest point at the opposite end.

Because the inlet channel comprises a top panel and a bottom panel, the fluid flowing through the inlet is guided in a downwards movement being pushed in the direction of the bottom plats. By adopting such a movement, the liquid droplets comprised within said fluid will more efficiently drop under the effect of the gravitational force and more liquid will be collected.

Further a symbiotic effect is encountered because the device comprises such an inlet channel with at least the top panel provided under an angle and the two circular walls creating a first and second fluid channel, because not only the fluid is guided in a downward movement as the fluid flows towards the first and second fluid channel but such a movement is maintained through such channels increasing even more the quantity of liquid extracted.

By collecting a bigger quantity of liquid immediately after it enters the device, the cyclones and said at least one filter are further protected from the potential damaging properties of the liquid, decreasing the frequency of service interventions and increasing the lifetime of the cyclones and of said the at least one filter.

The present invention is further directed to a method for separating a liquid from a gas stream within a liquid injected compressor, said method comprising the steps of:
- providing a first separation means comprising a first and a second liquid separation area, each of the first and second liquid separation area comprising a first plate onto which a circular wall is mounted and providing a first and second fluid channel between each of said circular wall and a first lateral wall;
- providing a second separation means in each of the first and second liquid separation area, and providing at least a cyclone therein;
- providing a third separation means comprising at least a filter, said filter being provided in fluid communication with one of said cyclones;
- providing a first vessel comprising the first and second liquid separation area, the second separation means and the third separation means, said first vessel comprising the first lateral wall comprising said inlet, a first bottom plate and a lid comprising an outlet;
- providing a fin type of structure for splitting the fluid flow from the inlet through the first and second fluid channels;

guiding the fluid from the first and second liquid separation area through the second separation means, collecting the liquid dripping from said fluid onto the first bottom plate, and further guiding the fluid through said third separation means before directing it through said outlet;

whereby the method further comprises the steps of:

providing an inlet channel comprising a top panel and a bottom panel and guiding the fluid flowing through said inlet channel in a downwards movement and further splitting it into two flows, through the first and second fluid channel, by a fin.

In the context of the present invention it should be understood that the benefits presented with respect to the device for separating liquid from a gas stream also apply for the method for separating a liquid from a gas stream.

The present invention is further directed towards a device for separating liquid from a gas stream within a liquid injected vacuum pump, said device comprising a first bottom plate, a first lateral wall comprising an inlet flu idly connected with an outlet of the vacuum pump and a lid comprising an outlet, the device further comprising:

a first separation means comprising a first and a second liquid separation area, said first and second liquid separation area being in fluid communication with the inlet; whereby each of the first and second liquid separation area comprises a first plate onto which a circular wall is mounted, whereby a first and a second fluid channel is created between said each of said circular wall and the first lateral wall;

a second separation means provided in each of the first and second liquid separation area, said second separation means comprising at least a cyclone mounted therein;

a third separation means comprising at least a filter mounted therein, whereby said filter is fluidly connected to one of said cyclones and whereby the third separation means is in fluid communication with the outlet;

an inlet channel being in fluid communication with said inlet, said inlet channel comprising a fin type of structure for dividing the gas flowing through the inlet into two flows whereby the device further comprises:

said inlet channel comprising a top panel and a bottom panel having one end adapted to be mounted onto the lateral wall, whereby at least said top panel is creating a slope, having the highest point onto the first lateral wall and the lowest point at the opposite end.

In the context of the present invention it should be understood that the benefits presented with respect to the device for separating liquid from a gas stream within a liquid injected compressor also apply for device for separating liquid from a gas stream within a liquid injected vacuum pump.

BRIEF DESCRIPTION OF THE DRAWINGS

With the intention of better showing the characteristics of the invention, some preferred configurations according to the present invention are described hereinafter by way of an example, without any limiting nature, with reference to the accompanying drawings, wherein.

DETAILED DESCRIPTION OF THE INVENTION

Figure 1:
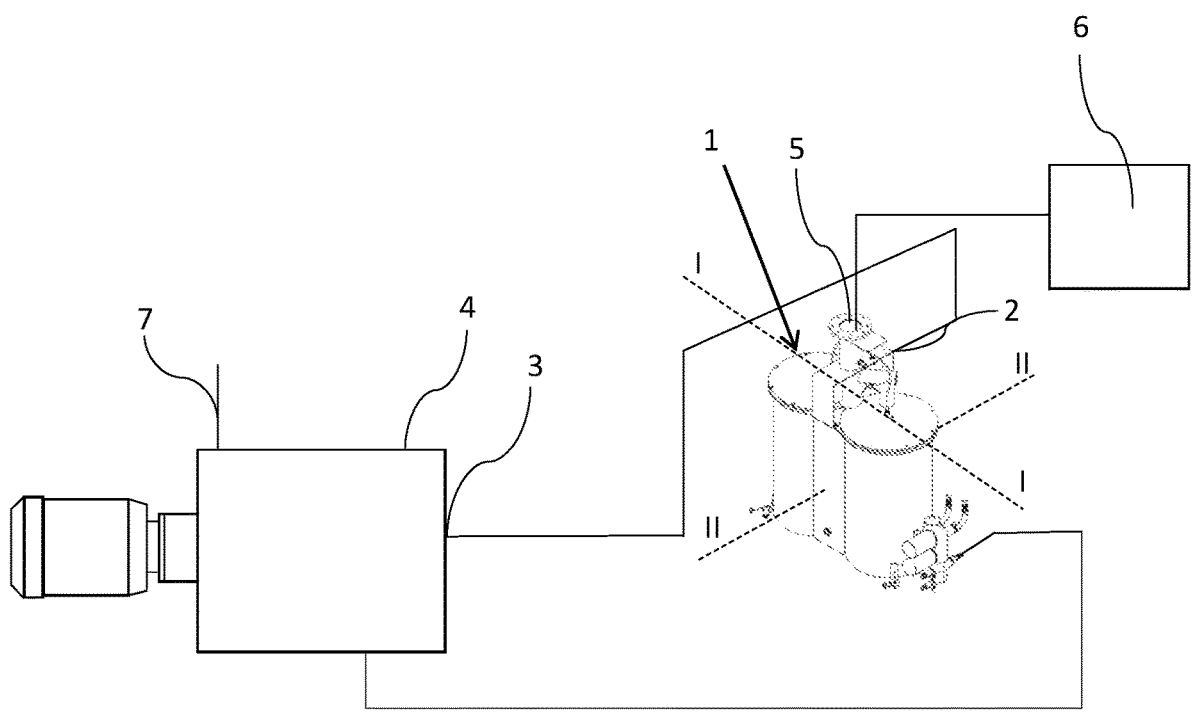
FIG. 1 schematically represents a device for separating liquid from a gas stream mounted within liquid injected compressor.

FIG. 1 shows a device 1 for separating liquid from a gas stream, said device 1 comprising an inlet 2 connected to a compressed gas outlet 3 of the compressor 4 and an outlet 5 providing relatively pure gas to a user's network 6.

The compressor 4 being a liquid injected compressor.

The compressor 4 typically having a gas inlet 7 through which ambient air is drawn in or process gas from a user's system (not shown).

Figure 2:
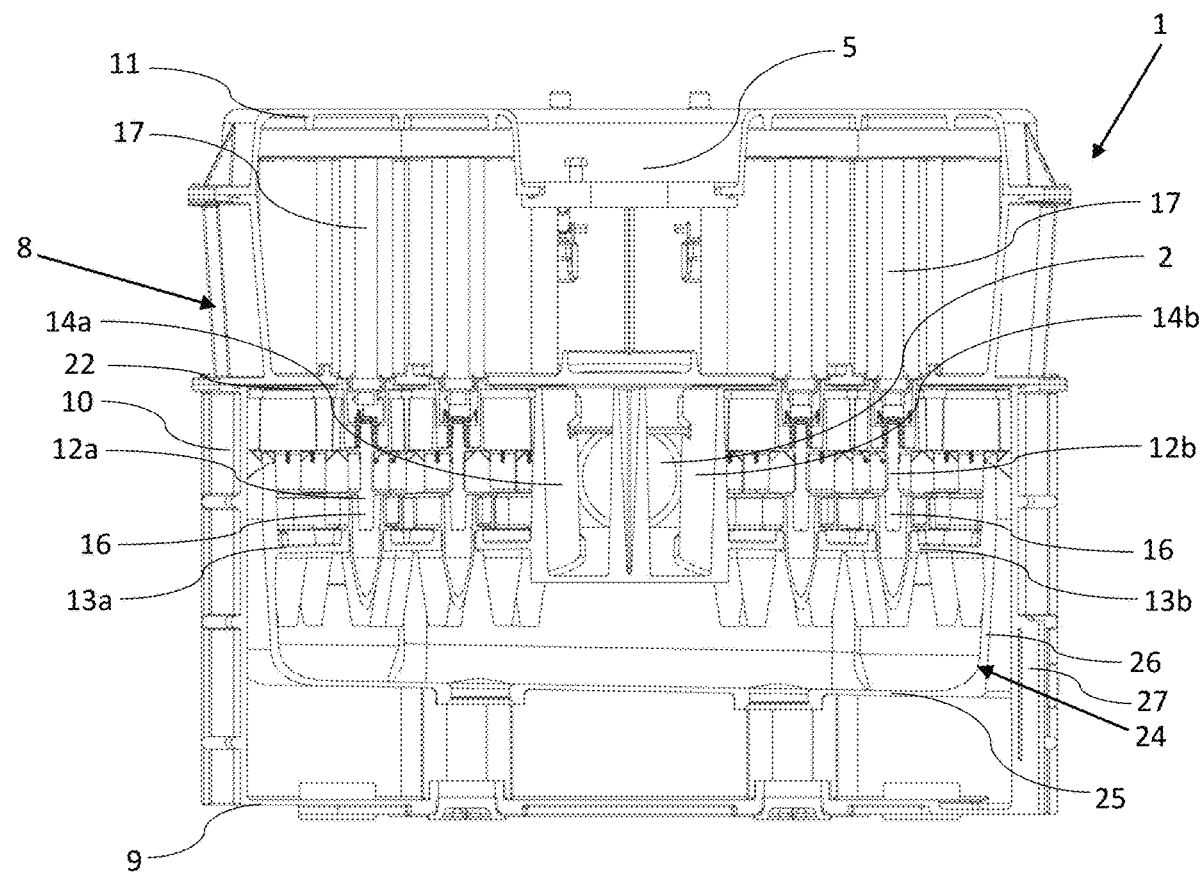
FIG. 2 schematically represents a cut-through of a device according to an embodiment of the present invention, according to line I-I from FIG. 1.

As seen from FIG. 2, the device 1 comprises a first vessel 8 comprising a first bottom plate 9, a first lateral wall 10 comprising said inlet 2 fluidly connected with said compressed gas outlet 3 and a lid 11 comprising the outlet 5.

The device 1 further comprises a separation means comprising a first and a second liquid separation areas, 12*a* and 12*b*, whereby the fluid entering through the inlet 2 is flowing towards said first and second liquid separation areas, 12*a* and 12*b*.

Each of the first and second liquid separation area, 12*a* and 12*b*, further comprises a first plate, 13*a* or 13*b*, onto which a circular wall, 14*a* or 14*b*, is mounted.

Figure 3:
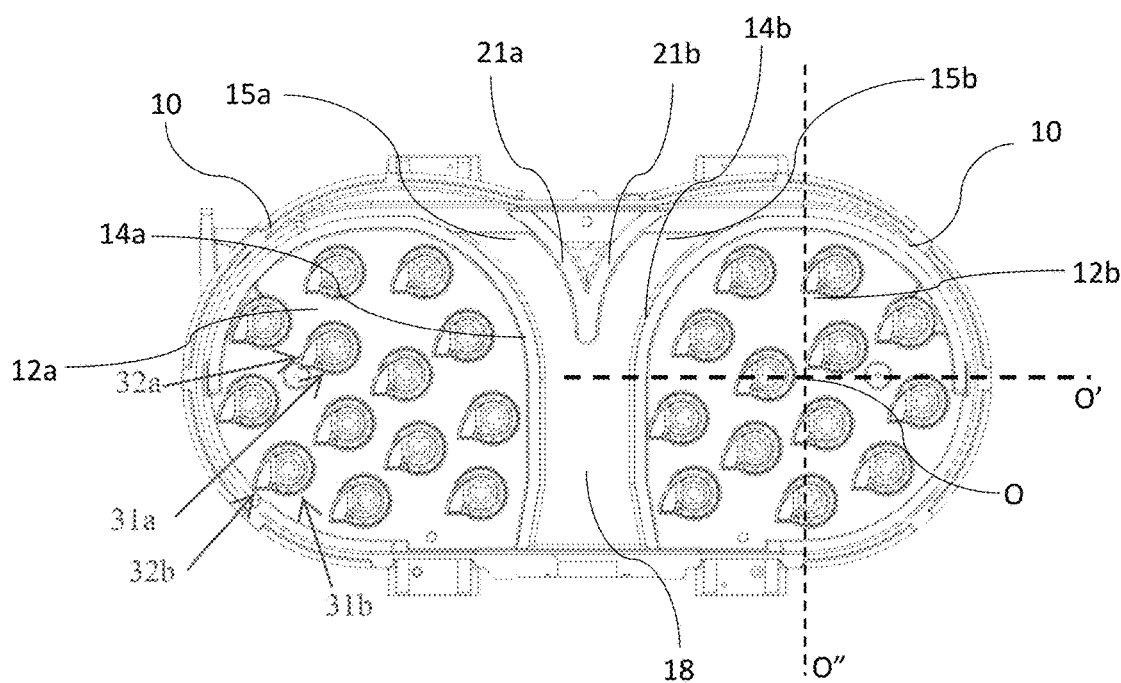
FIG. 3 represents a top view of the first liquid separation area, the second liquid separation area and part of the inlet channel according to an embodiment of the present invention.

For efficiently separating the liquid particles from the gas stream, the device 1 further comprises a first and a second fluid channel, 15*a* and 15*b*, created between each of said circular walls, 14*a* and 14*b*, and the first lateral wall 10, as illustrated in FIG. 3.

Returning to FIG. 2, the device 1 is further provided with a first separation means comprising the first and second liquid separation area, 12*a* and 12*b*, said first separation means comprising at least a cyclone 16 mounted therein.

The device further comprises a second separation means comprising at least a filter 17 mounted therein. For facilitating an efficient elimination of the fluid particles, the filter 17 is being fluidly connected to one of said cyclones 16.

Preferably, the inlet of the filter 17 is mounted directly onto the outlet of the cyclone 16.

Consequently, the fluid flowing out of the filter 17 is further flowing through the outlet 5.

Figure 4:
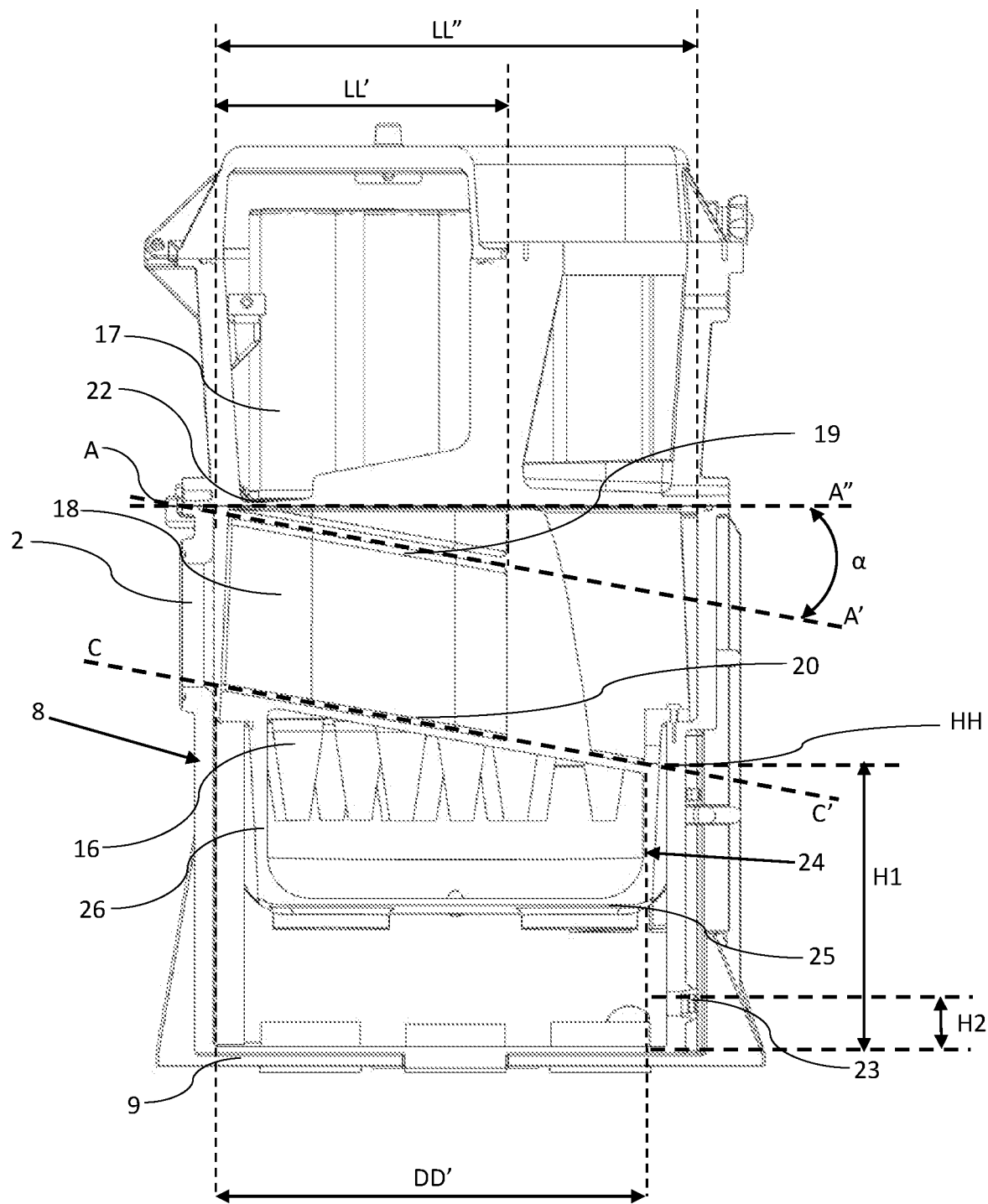
FIG. 4 schematically represents a cut-through of a device according to an embodiment of the present invention, according to line II-II from FIG. 1.

As illustrated in FIGS. 3 and 4, the device 1 further comprises an inlet channel 15 being in fluid communication with said inlet 2.

Such inlet channel 18 preferably comprising a top panel 19 and a bottom panel 20, whereby each of said top panel 19 and said bottom panel 20 have one end adapted to be mounted onto the first lateral wall 10.

The top panel 19 is preferably fixed onto the first lateral wall 10 above the inlet 2, and the bottom panel 20 is fixed onto the first lateral wall 10 under the inlet 2. Accordingly, the inlet 2 is received between the bottom panel 20 and the top panel 19.

For facilitating the extraction of the fluid particles from the fluid flow, at least the top panel 19 is creating a slope, having the highest point onto the first lateral wall 10 and the lowest point at the opposite end.

By the top panel 19 creating a slope should be understood as mounting said top panel 19 such that it is projecting downwards from the lateral wall 10 and in the direction of the first and second fluid channels 15a and 15b.

In other words at the intersection between the top panel 19 and the first lateral wall 10, an acute angle is encountered, said acute angle being realized by the top panel 19 and the first lateral wall 10. An acute angle should be understood as an angle smaller than 90° (ninety degrees).

Further, for dividing the gas flowing through the inlet 2 into two flows, the inlet channel 18 comprises a fin 21 type of structure.

Preferably, said fin 21 is being mounted onto the bottom panel 20.

Because the fin 21 is mounted onto the bottom panel 20, the fluid flowing through the inlet 2 can only flow through the first and second fluid channels 15a and 15b.

Furthermore, because the fin 21 helps in splitting the flow of fluid in two flows, the device 1 is built in such a way that two approximately identical halves are created, one comprising the first liquid separation area 12a and the second one comprising the second liquid separation area 12b, and because the pressure within the two halves is approximately equal, the fluid flowing through said inlet 2 is being split into two approximately equal flows.

Because the fluid entering the device 1 adopts such a pattern, the efficiency of the oil separation is maintained for a longer period of time, since such a device 1 would minimize the possibility of one half to encounter functional issues due to a bigger volume of liquid reaching its components when compared to the other half.

For maintaining the manufacturing costs low, the fin 21 comprises a first and a second continuous vertical structure, 21a and 21b, adjoined together under an angle.

Preferably, the first and second continuous vertical structures 21a and 21b are fixed onto the first lateral wall 10. The fin 21 being mounted on the opposite side from the inlet 2 and relatively central with respect to said inlet 2.

Preferably, for maintaining a circular movement of the fluid flowing through the first and second fluid channels 15a and 15b, each one of the first and second continuous vertical structures, 21a and 21b, are in the shape of a circular arc.

Further preferably, the first lateral wall 10 and each of the first and second continuous vertical structures, 21a and 21b, are creating a circular arc. In other words, at the point where one of the two continuous vertical structure 21a and 21b is being mounted onto the first lateral wall 10, the circular arc created by each of the first and second continuous vertical structures, 21a and 21b, is continued by the curvature of said first lateral wall 10.

Preferably, but not limiting thereto, the circular arc created by each of the first and second continuous vertical structures, 21a and 21b, and the curvature of said first lateral wall 10 is a continuous circular arc, without any turning points.

Because such a continuous circular arc is being formed, the liquid particles comprised within the fluid flawing through the inlet 2 will not directly hit the first and second continuous vertical structures, 21a and 21b, or the first lateral wall but will adhere to them and slide under the gravitational force towards the bottom panel 20 and further towards the first bottom plate 9, eliminating the risk of such liquid particles to bounce back into the flow stream and increasing the quantity of liquid extracted throughout the length of the inlet channel 18, the first fluid channel 15a and second fluid channel 15b.

Accordingly, as can be seen from FIG. 3, the first lateral wall 10 will have the shape of two semicircles adjoined by a middle section comprising the inlet channel 18. A plurality of cyclonic separators is formed by a plurality cyclones formed by a plurality of round walls (31a, 31b) each having a tangential inlet (32a, 32b).

In a preferred embodiment according to the present invention, and not limiting thereto, each of the two continuous vertical structures, 21a and 21b, is parallel to each of said circular walls, 14a and 14b.

Preferably, each or the circular walls 14a and 14b are mounted on the one end onto the first lateral wall 10, next to the inlet 2, and on the other end onto the respective first plate 13a and 13b.

Accordingly the inlet 2 is bordered by the circular walls 14a and 14b, the top panel 19 and the bottom panel 20 as can be seen in FIG. 2.

In a preferred embodiment but not limiting thereto, the top panel 19 at its lower end, or the end from the opposite side of the inlet 2, is adjoined to the fin 21.

Accordingly, the fluid flowing through the inlet 2 will be continuously guided downwards at least until reaching the fin 21, increasing the efficiency of liquid extraction.

In another embodiment according to the present invention, the top panel 19 can be fixed only on the first lateral wall 10.

In a further embodiment according to the present invention, the top panel 19 can be fixed to the first lateral wall 10 and to the circular walls 14a and 14b.

By being fixed it should be understood any mounting technique for adjoining the top panel 19 to the first lateral wall 10 and possibly to the circular walls 14a and 14b such as: welding, gluing or bolting, by using screws or any other technique. It should be further not excluded that said top panel 19 can be a casted component within said first lateral wall and possibly within the circular walls 14a and 14b.

In yet another embodiment according to the present invention, the top panel 19 can be of any length LL', selected between approximately 25% from the depth LL' of the first vessel 8, and approximately 90% from said depth LL'.

Preferably but not limiting thereto, the length LL' of the top panel 19 is selected such that it at least reaches the find 21.

In another embodiment according to the present invention, the top panel 19 and the bottom panel 20 are parallel to each other.

Because of such a structural feature, the device 1 according to the present invention eliminates the risk of the liquid particles to directly hit the bottom panel 20 and bounce back into the fluid stream.

In another embodiment according to the present invention, the slope of the top panel 19 and/or of the bottom panel 20, or the angle α from FIG. 4, is of at least approximately 10° (ten degrees), the angle of 10° being measured at the intersection between the top panel 19 and a horizontal surface. As illustrated in FIG. 4 the angle α can be measured at the intersection between the separating plate 22 and the top panel 19 if the separating plate 22 and the top panel 19 are fixed onto the first lateral wall 10 at the same location.

Or said angle α can be measured between the top panel 19 and a surface parallel to the separating plate 22, said surface being drawn through the location where the top panel 19 is intersecting the first lateral wall 10.

Accordingly, if we turn to FIG. 4, the angle α can be measured between the virtual surface AA' drawn alongside and in continuation of the surface defined by the top panel 19 and the virtual surface AA', drawn from the location where the top panel 19 is intersecting the first lateral wall 10 and parallel to or alongside and in continuation of the surface defined by the separating plate 22.

In the context of the present invention it should be understood that said slope can be bigger or smaller than 10° (ten degrees) and preferably said slope is different than 0° (zero degrees).

Preferably, but not limiting thereto, if we were to draw a surface CC' alongside and in continuation of the surface defined by the bottom panel 20, the maximum angle α of the slope can be determined as follows: if we were to consider the virtual point HH at the intersection between the surface CC' and the first lateral wall 10. The virtual point HH being located at a height H1 measured from the level of the first bottom plate 9, said height H1, at its lowest point, can be of approximately three times the maximum height H2 of liquid which can be found in the first vessel 8, said height H2 being measured also from the level of the first bottom plate 9.

It should be further understood that the present invention can also be implemented for a device 1 having an angle α for the slope with any value selected between approximately 10° and a maximum angle determined by a virtual surface drawn through the point HH', like for example and not limiting thereto: said angle α can be selected as any value between approximately 10° and approximately 45° (forty-five degrees), more preferably said angle α can be selected as any value between approximately 10° and approximately 30° (thirty degrees), even more preferably said angle α can be selected between approximately 10° and approximately 20° (twenty degrees).

In another embodiment according to the present invention, the slope of the top panel 19 can have the same value as the slope of the bottom panel 20 or can be of different value.

The first vessel 8 further comprises a first liquid extraction means such as for example a valve, a pipe, a tap or the like, mounted onto the first lateral wall 10, for draining the liquid gathered onto the first bottom plate 9 and possibly recirculating such liquid by injecting it into the compressor 4.

The maximum height H2 of liquid which can be found in the first vessel 8 is the maximum allowed height at which the first liquid extraction means starts to extract liquid from the first vessel 8.

In a preferred embodiment and not limiting thereto, said liquid is oil. Another liquid such as water or another lubricating agent should also not be excluded from the present invention.

For separating the second separation means from the third separation means, the device 1 further comprises a separating plate 22 onto which the filter 17 is mounted.

Because such separating plate 22 is mounted, the fluid flowing through the first and second liquid separation areas 12a and 12b cannot reach the third separating means without flowing through said at least one cyclone 16. Accordingly, a minimum requirement for the concentration of liquid in the fluid flowing through the third separation means is assured.

Preferably, for controlling even more the path of the fluid flowing through the inlet 2, the circular walls 14a and 14b, are extending between the respective first plate 13a or 13b and the separating plate 22. Accordingly, the fluid flowing through the inlet 2 cannot directly reach the third separation means, but will first have to flow through the inlet channel 18, the first and second fluid channels 15a and 15b and further through the at least one cyclone 16.

In another preferred embodiment and not limiting thereto, the fin 21 is mounted onto the bottom panel 20 and onto the separating plate 22.

In yet another embodiment, the bottom panel 20 is a continuous structure having a length DD' of any value selected between approximately 25% from the depth LL" of the first vessel 8 and approximately 95%, from the depth LL".

In another embodiment according to the present invention, the bottom panel 20 is a continuous structure along the depth of the first vessel 8. In other words, the bottom panel 20 can have a length DD' equal to the depth LL" of the first vessel 8.

In yet another embodiment according to the present invention, the bottom panel 20 can be a continuous structure extending along at least a part of the first and second fluid channel 15a and 15b. A further possibility is for the bottom panel 20 to extend along the length of the first and second fluid channel 15a and 15b.

In a further embodiment according to the present invention, the bottom panel 20 can be in the shape of a perforated panel, or said bottom panel 20 can comprise perforations at certain intervals, allowing the liquid to reach the first bottom plate 9.

For maintaining a circular movement for the fluid reaching the first liquid separation area 12a and the second liquid separation area 12b, the first and second liquid separation areas 12a and 12b are relatively circular.

Accordingly, a first cyclone is realized from the inlet 2, along the inlet channel 18 and the first and second fluid channel 15a and 15b. The circular movement of the fluid continuing within the first and second liquid separation areas 12a and 12b, until the fluid enters said at least one cyclone 16.

In another embodiment according to the present invention, at least one circular wall, 14a or 14b, has a length of at least 50% from the length of the exterior contour of the first plate, 13a or 13b.

In a preferred embodiment according to the present invention each of the circular walls 14a and 14b have a length of at least 50% from the length of the exterior contour of each of the respective first plate, 13a and 13b.

By increasing the length of the circular walls 14a and 14b, the first fluid channel 15a and the second fluid channel 15b are made longer, forcing the fluid to follow a longer path through said first and second fluid channels 15a and 15b and enhancing the quantity of liquid extracted before reaching the first liquid separation area 12a and the second liquid separation area 12b respectively.

The length of the circular walls 14a and 14b can be made even longer. As shown in FIG. 3, if we are to draw the axis OO' and OO", the length of the circular walls 14a and 14b can be selected at any point between the OO' axis and the OO" axis.

Preferably, but not limiting thereto the length of the circular walls 14a and 14b is selected such that the circular walls 14a and 14b end in the vicinity of the virtual axis OO'.

Because the length of the circular walls 14a and 14b is increased the fluid flowing through the first and second fluid channel 15a and 15b would be maintained in a downwards and circular movement for longer, forcing such fluid to lose more liquid particles before reaching the inlet of the at least one cyclone 16. Furthermore, the circular movement will be still maintained within the first liquid separation area 12a and the second liquid separation area 12b, until the fluid reaches the inlet of the at least one cyclone 16.

Tests have shown that by the time the fluid reaches the first liquid separating area 12a and the second liquid separating area 12b respectively, the majority of the fluid entrapped therein will be under the level of the first plate 13a and 13b respectively, which means that the quantity of liquid particles reaching said at least one cyclone 16 is much lower when compared to existing devices.

In another embodiment according to the present invention the circular walls 14a and 14b can have a constant height along their length, such height being defined by the distance between each of the first plate 13a and 13b respectively and the separating plate 22.

Because the space defined between the bottom panel 20 and the separating plate 22 can be bigger than the space defined by each of the first plate 13a and 13b and the separating plate 22, the height of the circular walls is defined by the distance between the bottom panel 20 and the separating plate 22, such that the inlet channel 18 will be defined by at least the circular walls 14a and 14b, the top panel 19 and the bottom panel 20.

Therefore the height of the circular wall 14a and 14b after the inlet channel 18 has ended can be constant and equal to the distance between the bottom panel 20 and the separating plate at the location where the inlet channel 18 has ended, and therefore, where the bottom panel 20 is at its lowest point.

In another embodiment according to the present invention, each of the circular walls 14a and 14b can maintain for a minimum distance a height equal to the distance between the bottom panel 20 and the separating plate 22 at the lowest point of the bottom panel 20 and then such height would preferably decrease gradually in height until reaching the level of each of the first plate 13a and 13b respectively.

Figure 5:
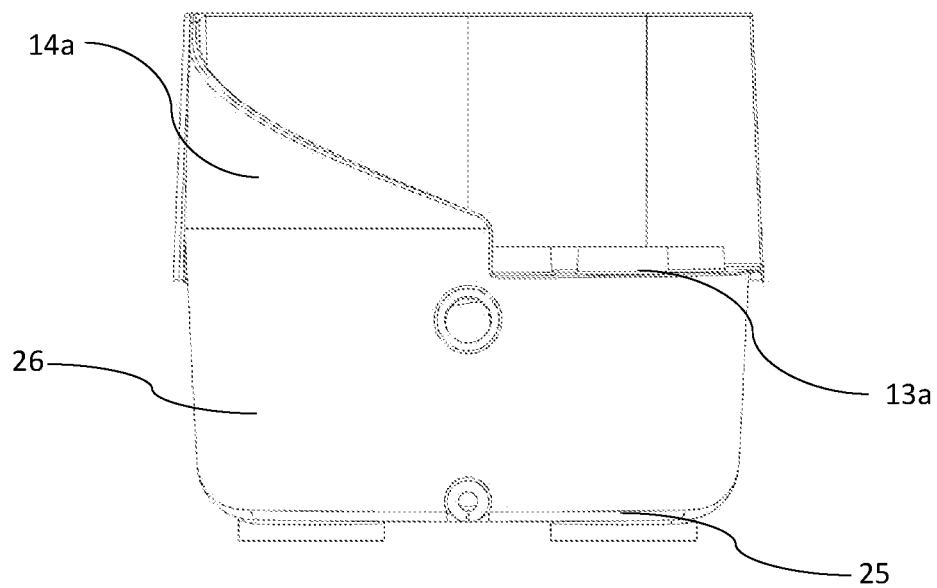
FIG. 5 schematically represent a lateral view of a second vessel and of a circular wall according to an embodiment of the present invention.
Figure 6:
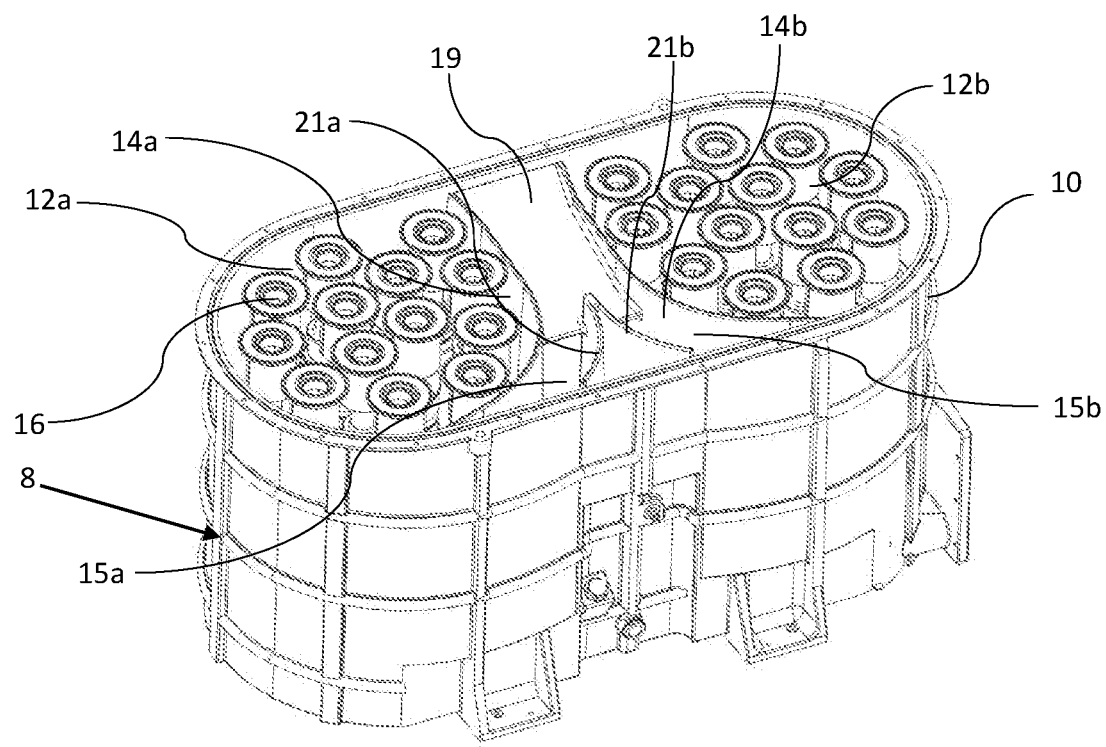
FIG. 6 represents a top view of the first liquid separation area, the second liquid separation area and the inlet channel according to an embodiment of the present invention.

In yet another embodiment according to the present invention, as illustrated in FIG. 5, the height of each of the circular walls 14a and 14b can decrease gradually from the location where the inlet channel 18 has ended and until reaching the level of each of the first plate 13a and 13b respectively, or until reaching the location or the vicinity of the location where the virtual axis OO' is defined on the first plate 13a and 13b. After reaching the location or the vicinity of the location defined by the virtual axis OO', the circular walls 14a and 14b being cut perpendicularly or approximately perpendicularly onto the first plate 13a or 13b respectively. By perpendicularly or approximately perpendicularly, one should understand that a 90° (ninety degrees) angle or an approximately 90° (ninety degrees) angle is created between the ending of the circular wall 14a or 14b and the respective first place 13a or 13b.

In another embodiment according to the present invention, the device 1 further comprises a second vessel 24 comprising a second bottom plate 25 and a second lateral wall 26, whereby each the first plate 13a and 13b is mounted onto the second lateral wall 26.

Preferably, the inlet channel 18 is protruding into the second vessel 24, traversing it through the middle.

Further preferably, the inlet channel 18 is not in direct fluid communication with said second vessel 24, said inlet channel 18 being external to said second vessel 24.

Preferably, each of the first plate 13a and 13b comprises a plurality of holes, each of the holes having a cyclone 16 mounted therein. The number of cyclones 16 is selected according to the capacity of the device 1, such number being any number selected between six and sixteen. More preferably each of the first plates 13a and 13b comprise nine, twelve or thirteen holes, each hole having a cyclone 16 mounted therein.

Further preferably, a filter 17 is mounted at the outlet of each of said cyclones 16 such that the fluid leaving the cyclone 16 is flowing through the filter 17 before reaching the outlet 5.

Each of the cyclones 16 being mounted within said hole of the first plate 13a and 13b, whereby the liquid extracted within the cyclones is dripping onto the second bottom plate 25.

Tests have shown that by adopting such a configuration, the liquid reaching the inlets of the cyclones 16 has a very high purity, and that approximately 95% of the liquid present in the fluid flowing through the inlet 2 has been separated and collected on the first bottom plate 9, and reaches a very high purity at the outlet 5, where approximately 98% of the liquid would have been separated from the fluid.

In a preferred embodiment according to the present invention, the second vessel 24 comprises a second liquid extraction means 27.

The first liquid extraction means 23 and the second liquid extraction means 27 can be selected from a group comprising: a one way valve, a manually or automatically actuated valve, a hose, a tap or a pipe possibly but not necessarily connected to a suction device, or the like.

It should be further understood that the first liquid extraction means 23 can be of the same type as the second liquid extraction means 27 or it can be different.

In another embodiment according to the present invention, each of the first plates 13a and 13b is fixed onto the first lateral wall 10 through for example and not limiting thereto: welding, bolting or by using additional fixing mechanisms.

In yet another embodiment according to the present invention, each of the first plates 13a and 13b are fixed onto the second lateral wall 26, and said second lateral wall 26 is further fixed to the first lateral wall 10 through the same possible techniques as mentioned with respect to fixing said first plates 13a and 13b to the first lateral wall.

In a preferred embodiment according to the present invention, a channel is created between the second lateral wall 26 and the first lateral wall 10, whereby the liquid extracted from the fluid is dripping, reaching the first bottom plate 9.

Further preferably, the fixing means of the first plates 13a and 13b are realized in such a manner that liquid can drip in between the fixing means and reach the first bottom plate 9.

In another embodiment according to the present invention, the second vessel 24 is fixed to the first bottom plate 9, said fixing being realized directly between the first bottom plate 9 and the second bottom plate 25, or said fixing being done by using for example pillars between the first bottom plate 9 and second bottom plate 25.

The functioning of the device 1 according to the present invention is very simple and as follows.

The fluid flowing from the compressed gas outlet 3 of the liquid injected compressor 4 is guided through the inlet 2 of the device 1, said fluid comprising a gas and liquid particles.

The flow of fluid entering through said inlet 2 traverses the inlet channel 18, is then split in two flows by the fin 21, each of the two flows traverses one of the first or second fluid channel 15a or 15b and reaches the first liquid separation area 12a or the second liquid separation area 12b.

The fluid is further reaching a second separation means comprising at least a cyclone 16 and further a third separation means comprising at least a filter 17 mounted at the outlet of said at least one cyclone 16.

After the fluid is flowing thorough said at least one filter 17, it is guided through the outlet 4 towards the user's network 6.

At least along the inlet channel 13 the fluid is guided in a downwards movement.

The downwards movement should be understood as in the direction of the gravitational force.

While the fluid is traversing the inlet channel 18, the first and second fluid channel 15a and 15b, the first liquid separation area 12a and the second liquid separation area 12b, the liquid separated from the gas stream is collected on the first bottom plate 9 from where it is later extracted with the help of the first liquid extraction means 23.

Because of the shape of the inlet channel 18, the shape of the circular walls 14a and 14b and of the fin 21, a downwards and circular movement is imprinted to the fluid entering through said inlet 2.

Accordingly a synergetic effect is encountered: due to the downwards movement, the liquid particles are dropping more easily towards the bottom panel 20 and further towards the first bottom plate 9 under the action of the gravitational force; and due to the circular movement, the liquid particles are pushed under the action of the centrifugal force towards the first lateral wall 10, where they adhere to it and further drop towards the first bottom plate 9. Such synergetic effect increasing the efficiency of the liquid separation.

In a preferred embodiment according to the present invention at least one hole is provided onto the first plate 13a and 13b for mounting the at least one cyclone 16 therein.

Further, a second vessel 24 is provided, said second vessel 24 comprising a second bottom plate 25, a second lateral wall 26 and the first plate 13a and 13b. The liquid dripping from the at least one cyclone 16 being collected onto said second bottom plate 25.

Because a second vessel 24 is provided with a second bottom plate 25, the liquid collected before and within the first liquid separation area 12a and the second liquid separation area 12b is separated from the liquid collected with the help of the cyclones mounted onto said first plate 13a and 13b. Consequently, the risk of the collected liquid to re-enter the gas stream is minimized if not eliminated.

Further, the downwards and circular movement is maintained for a longer distance by guiding the fluid flowing from the inlet 2 through the first and second fluid channel 15a and 15b, along at least 50% of the length of the exterior contour of said respective first plate, 13a and 13b.

For increasing the efficiency of the liquid separation a separating plate 22 is provided for separating the second separation means from the third separation means.

In the context of the present invention it should be understood that the device for separating liquid from a gas stream and the method for separating a liquid from a gas stream are not restricted to liquid injected compressors, such device and method being implementable in a liquid injected vacuum pump as well.

If the device 101 is used within a liquid injected vacuum pump 104, the layout of the system is very similar as when the device 1 is used within a liquid injected compressor 4.

The device 101 comprising an inlet 102 connected to a gas outlet 103 of the vacuum pump 104.

Figure 7:
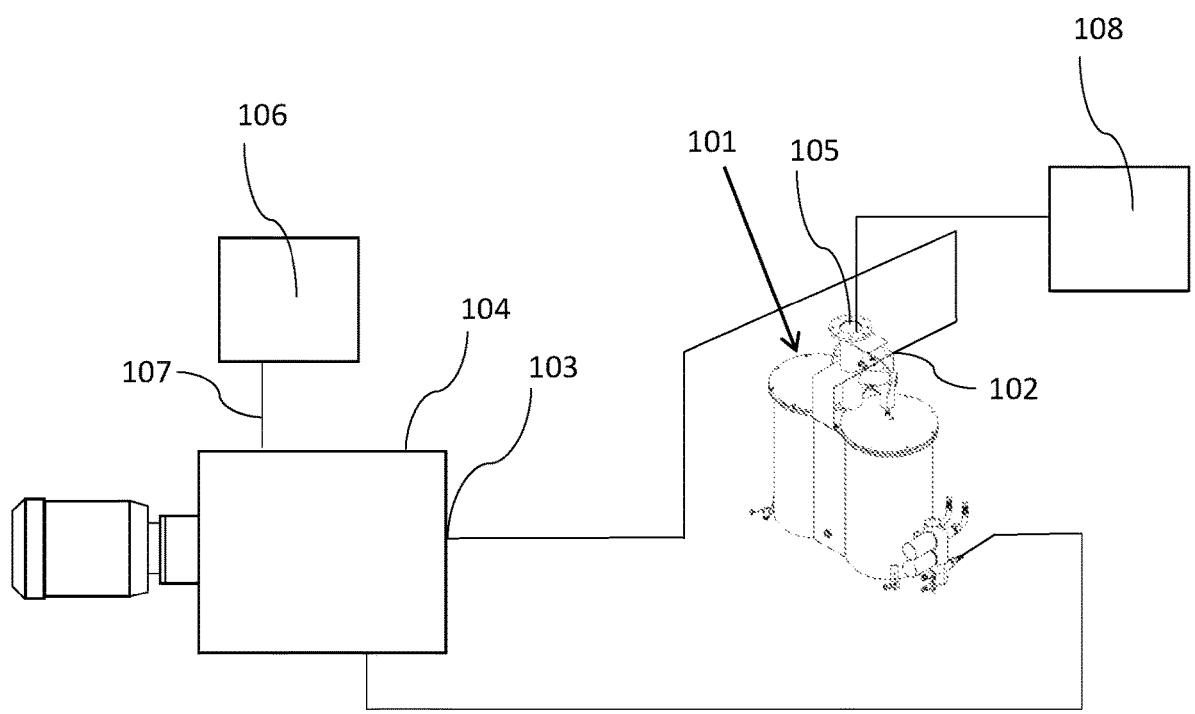
FIG. 7 schematically represents a device for separating liquid from a gas stream mounted within a liquid injected vacuum pump.

The only differences are that the liquid injected vacuum pump 104 is receiving a gas at its inlet 107 from a user's network 106, and that the gas flowing from the outlet 105 of the device 101 is further evacuated to the atmosphere or to an external system 108, as illustrated in FIG. 7.

In the context of the present invention it should be understood that the different features as defined within the present paper can be used in any combination without departing from the scope of the invention.

The present invention is by no means limited to the embodiments described as an example and shown in the drawings, but such a gas filter 1 can be realized in all kinds of variants, without departing from the scope of the invention.

The invention claimed is:

1. A device for separating liquid from a gas stream within a liquid injected compressor, said device comprising:
   a first vessel comprising a first bottom plate, a first lateral wall comprising an inlet fluidly connected with a compressed gas outlet, and a lid comprising an outlet, the device further comprising in the first vessel:
   a first separation area and a second liquid separation area, said first and second liquid separation areas are each in fluid communication with the inlet, wherein each of the first and second liquid separation areas comprises a first plate onto which a circular wall is mounted, wherein a first fluid channel and a second fluid channel are created between each of said circular wall and the first lateral wall;
   in each of the first and second liquid separation areas a plurality of cyclones mounted therein, wherein the first and the second fluid channels are in fluid communication with the plurality of cyclones by opening along each of said circular walls, wherein each of said plurality of cyclones is formed by an internal round wall having a tangential inlet;
   a filter mounted therein, wherein said filter is fluidly connected to the plurality of cyclones and is in fluid communication with the outlet;
   an inlet channel being in fluid communication with said inlet, the inlet channel comprising a fin for dividing the compressed gas flowing through the inlet into at least two flows into at least the first and the second fluid channels, respectively,
   wherein the device further comprises:
   said inlet channel comprising a top panel and a bottom panel having one end mounted onto the first lateral wall, wherein at least said top panel is creating a slope, having a highest point onto the first lateral wall and a lowest point at the opposite end,
   wherein the device is configured in a way such that the compressed gas is provided in a downwards and a circular movement within the first and the second fluid channels and the first and the second liquid separation areas.

2. The device according to claim 1, wherein said fin being adapted to be mounted onto the bottom panel.

3. The device according to claim 1, wherein the fin comprises a first and a second continuous vertical structures adjoined together under an angle.

4. The device according to claim 3, wherein the two continuous vertical structures are in the shape of a circular arc.

5. The device according to claim 3, wherein each of the two continuous vertical structures is parallel to each of said circular walls.

6. The device according to claim 1, wherein the circular walls are mounted on the one end onto the first lateral wall and on the other end onto the first plate.

7. The device according to claim 1, wherein the top panel at a lower end is adjoined to the fin.

8. The device according to claim 1, wherein the top panel and the bottom panel are parallel to each other.

9. The device according to claim 1, wherein the device further comprises a separating plate onto which the filter is mounted.

10. The device according to claim 9, wherein the fin is mounted onto the bottom panel and onto the separating plate.

11. The device according to claim 1, wherein the bottom panel is a continuous structure along the depth of the first vessel.

12. The device according to claim 1, wherein the first and second liquid separation areas are relatively circular.

13. The device according to claim 1, wherein at least one circular wall has a length of at least 50% from the length of the exterior contour of the respective first plate.

14. The device according to claim 1, wherein the device comprises a second vessel comprising a second bottom plate and a second lateral wall, whereby the first plate is mounted onto the second lateral wall.

15. A method for separating a liquid from a gas stream within a liquid injected compressor, said method comprising the steps of:
providing a first liquid separation area, and a second liquid separation area, each of the first and second liquid separation areas comprising a first plate onto which a circular wall is mounted and providing a first fluid channel and second fluid channel between each of said circular wall and a first lateral wall;
providing in each of the first and second liquid separation areas a plurality of cyclones therein, wherein the first and the second fluid channels are in fluid communication with the plurality of cyclones by opening along each of said circular walls, wherein each of said plurality of cyclones is formed by an internal round wall having a tangential inlet;
providing a filter, said filter in fluid communication with the plurality of cyclones;
providing a first vessel comprising the first and second liquid separation area, the plurality of cyclones and the filter, said first vessel comprises a first lateral wall comprising said inlet, a first bottom plate and a lid comprising an outlet;
providing a fin for splitting the fluid flow from the liquid injected compressor from the inlet through at least the first and second fluid channels;
guiding the fluid from the first and second liquid separation areas through the plurality of cyclones, collecting the liquid dripping from said fluid onto the first bottom plate, and further guiding the fluid through said filter before directing it through said outlet;
wherein the method further comprises the steps of:
providing an inlet channel comprising a top panel and a bottom panel and guiding the fluid flowing through said inlet channel in a downwards movement and further splitting it into at least two flows, through the first and second fluid channels, by a fin so that the compressed gas is provided in the downwards and a circular movement.

16. The method according to claim 15, wherein the fin is mounted onto said bottom panel.

17. The method according to claim 15, further comprising providing at least one hole onto the first plate for mounting the at least one cyclone therein.

18. The method according to claim 15, further comprising providing a second vessel comprising a second bottom plate, a second lateral wall and said first plate and collecting the liquid dripping from the at least one cyclone onto said second bottom plate.

19. The method according to claim 15, further comprising guiding the fluid flowing from the inlet through the first and second fluid channel along at least 50% of the length of the exterior contour of said respective first plate.

20. The method according to claim 15, further comprising separating the cyclone from the filter by providing a separating plate there between.

21. A device for separating liquid from a gas stream within a liquid injected vacuum pump, said device comprising a first bottom plate, a first lateral wall comprising an inlet fluidly connected with an outlet of the vacuum pump and a lid comprising an outlet, the device further comprising:
a first liquid separation area and a second liquid separation area, said first and second liquid separation areas being in fluid communication with the inlet, wherein each of the first and second liquid separation areas comprises a first plate onto which a circular wall is mounted, wherein a first fluid channel and a second fluid channel are created between said each of said circular walls and the first lateral wall;
in each of the first and second liquid separation areas at least a plurality of cyclones mounted therein, wherein the first and the second fluid channels are in fluid communication with the plurality of cyclones by opening along each of said circular walls, wherein each of said plurality of cyclones is formed by an internal round wall having a tangential inlet;
at least a filter mounted therein, wherein said filter is fluidly connected to the plurality of cyclones and is in fluid communication with the outlet;
an inlet channel being in fluid communication with said inlet, the inlet channel comprising a fin for dividing the gas flowing through the inlet into at least two flows into at least the first and the second fluid channels, respectively,
wherein the device further comprises:
said inlet channel comprising a top panel and a bottom panel having one end mounted onto the first lateral wall, wherein at least said top panel is creating a slope, having a highest point onto the first lateral wall and a lowest point at the opposite end,
wherein the device is configured in a way such that the gas is provided in a downwards and a circular movement within the first and the second fluid channels and the first and the second liquid separation areas.

\* \* \* \* \*